United States Patent [19]

Hodges et al.

[11] 4,199,920
[45] Apr. 29, 1980

[54] MANE TAMING DEVICE

[76] Inventors: Dean R. Hodges; Carolyn M. Hodges, both of 11870 Kirkwood St., Hearld, Calif. 95638

[21] Appl. No.: 918,744

[22] Filed: Jun. 26, 1978

[51] Int. Cl.² .......................... B68B 5/00; B68B 7/00
[52] U.S. Cl. ............................................. 54/1; 54/67
[58] Field of Search ...................... 54/67, 65, 79, 1; 132/9; 2/DIG. 6

[56] References Cited

U.S. PATENT DOCUMENTS

| | | | |
|---|---|---|---|
| 585,306 | 6/1897 | Dailey | 54/79 |
| 1,593,672 | 7/1926 | Reynolds | 54/65 |
| 3,466,852 | 9/1969 | Stoner | 54/79 X |

Primary Examiner—Hugh R. Chamblee
Attorney, Agent, or Firm—Townsend and Townsend

[57] ABSTRACT

A device for causing a horse's mane to lie flat for show purposes. The device includes a nonporous panel directly overlying the horse's mane. A mesh fabric collar fits around the horse's neck, and holds the panel in place. The panel causes a controlled amount of sweating which causes the mane to remain in a flat position when the collar is removed.

11 Claims, 3 Drawing Figures

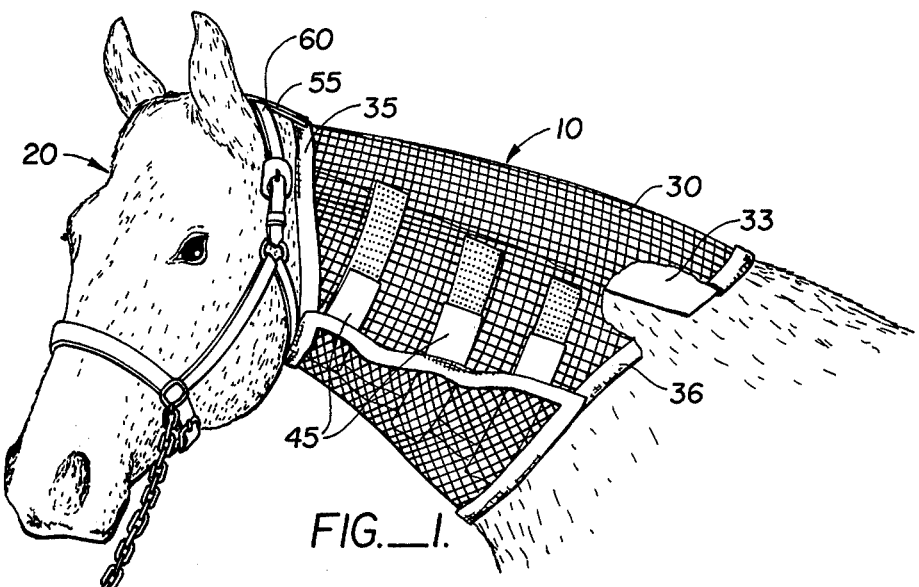
FIG._1.
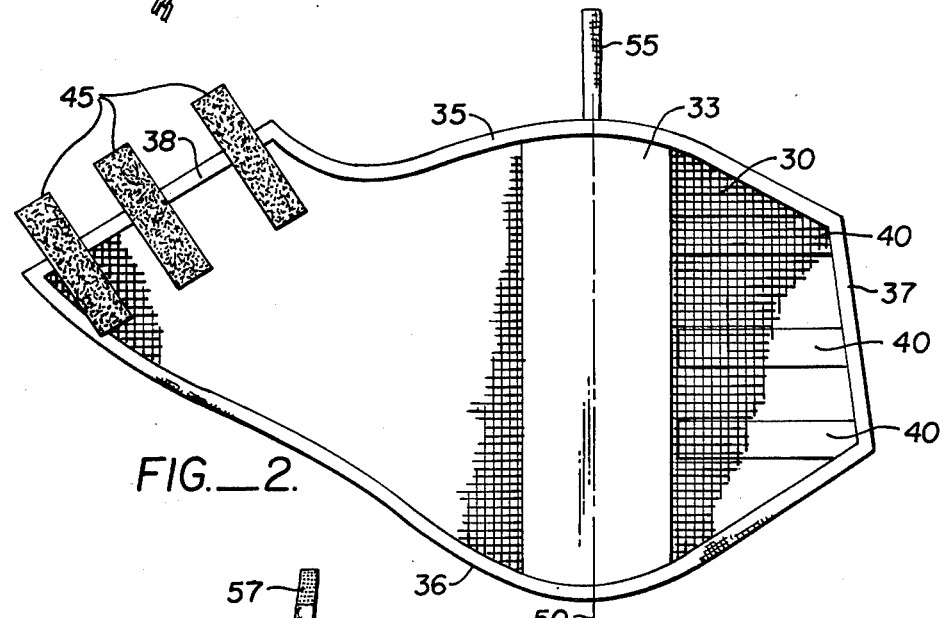
FIG._2.
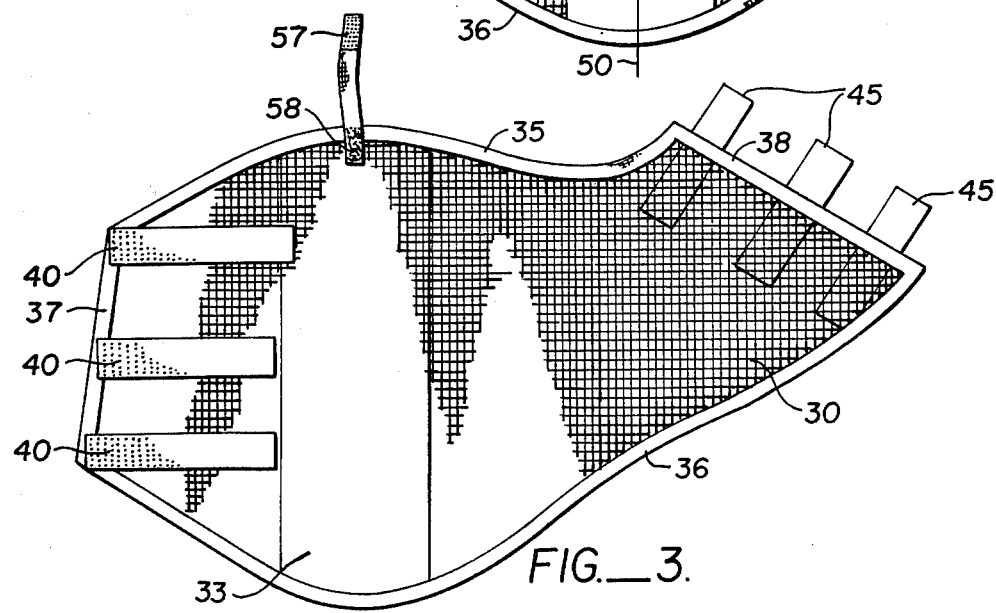
FIG._3.

4,199,920

MANE TAMING DEVICE

BACKGROUND OF THE INVENTION

It is desirable in the showing of horses to have the mane lie flat against the neck in order to make the neck look sleeker and finer. However, some types of horses, such as halter and performance horses, have relatively short manes that do not readily lie flat against the neck. While it has been found that the manes of such horses can be caused to remain in a relatively flat position by the placement of a mesh collar around the horse's neck for a period of time prior to the showing of the horse, such prior art devices have not been entirely successful in achieving the desired results. In particular, such devices must be left on the horse's neck for a relatively long period of time before the show. This may be impractical, as for example if the horse must be transported immediately before the show. Moreover, the degree of flattening and the length of time that the mane remains flat is only marginally adequate. Generally, as soon as the collar is removed, the mane begins to assume its previous position.

In spite of the above summarized drawbacks that are encountered with the prior art mane taming devices, such devices are still widely used. The need to leave them on the neck for a relatively long period of time and the less than optimum results have been accepted as inevitable.

SUMMARY OF THE INVENTION

The present invention provides a mane taming device that achieves a high degree of mane flattening for show purposes within a relatively short period of time (e.g. 30 minutes or less). Broadly, the present invention includes a relatively nonporous panel directly overlying the horse's mane. A mesh fabric collar fits around the horse's neck, and holds the panel in place. The nonporous panel causes the region under the mane to undergo a controlled amount of sweating, thereby rendering the mane relatively limp so that it holds the desired flat position when the device is removed.

The size of the collar and the size of the panel are scaled to the size of the horse to which the device is applied. Additionally, the nonporous panel is made narrower when the device is to be used in a relatively hot climate where the degree of sweating would be greater. Depending on climate, panel widths of 5–12 inches are appropriate for full sized horses.

Sometimes, better results are achieved if a small amount of water is applied to and combed through the horse's mane prior to placement of the mane taming device. In such a case, the nonporous panel, in addition to inducing a small amount of sweating, prevents the water from evaporating, thereby enhancing the tendency of the mane to become limp and remain in its flattened position.

BRIEF DESCRIPTION OF THE DRAWINGS

FIG. 1 is a perspective partially cutaway view of a mane taming device according to the present invention in use on a horse's neck;

FIG. 2 is a plan view of the mane taming device in a flattened condition, showing a first surface thereof; and FIG. 3 is a plan view of the mane taming device in a flattened condition, showing a second surface thereof.

DESCRIPTION OF THE PREFERRED EMBODIMENT

FIG. 1 shows a mane taming device 10 according to the present invention as applied to the neck of a horse 20. The particular structure of mane taming device 10 is best seen by reference to FIGS. 2 and 3. Broadly, mane taming device 10 comprises a mesh collar 30 adapted to conform to the horse's neck, and a generally rectangular nonporous panel 33 secured to mesh collar 30. Collar 30 is bounded by a front edge 35, a rear edge 36, a first side edge 37, and a second side edge 38. A first plurality of fasteners 40 along first side edge 37 cooperates with a second corresponding plurality of fasteners 45 along second side edge 38 when side edges 37 and 38 are brought into proximity, as for example when collar 30 is wrapped around the horse's neck.

Panel 33 is substantially symmetrical about a center line 50 which extends between front and rear edges 35 and 36. Panel 33 is constructed of a relatively nonporous material that is highly flexible. While vinyl or polyethylene sheet is preferred, closely woven fabric of such materials as nylon or polyester could also be used.

The shape of mesh collar 30 is chosen to allow it to be comfortably wrapped around the horse's neck so it holds nonporous panel 33 symmetrically across the top of the neck. Since the neck is tapered toward the front, edge 35 is shorter than rear edge 36. Also, since the neck is shorter along its bottom than along its top, side edges 37 and 38 are shorter than panel 33. The shape of mesh collar 30 is preferably asymmetric with respect to panel center line 50, so that fasteners 40 and 45 are located generally to one side of the horse's neck when mane taming device 10 is in place. This provides better accessibility for placement and removal of the device.

Collar 30 is constructed of a material that is highly flexible and highly porous. The preferred material for collar 30 is "huckleknit" mesh, formerly marketed by Maverick Fabrics, San Carlos, California. This material is actually a knitted material having relatively large square apertures disposed in a rectilinear array, so that its appearance resembles that of a mesh. The apertures are typically ⅛-inch squares on ¼-inch centers, with the fabric in between being a relatively loosely woven material. Other types of mesh material would also be suitable.

Fasteners 40 are preferably panels of a hooking material such as "Velcro" produced by the American Velcro Corporation, New York, New York; fasteners 45 are preferaby panels of a pile material that presents upstanding loops that engage the hooks on fasteners 40 and hold them in position.

A small strap 55 extends outwardly from front edge 35 along centerline 50. Strap 55 is provided with cooperating fasteners 57 and 58, also preferably of "Velcro" material. Edges 35, 36, 37 and 38 are preferably hemmed with a strip of fabric to prevent unraveling of the mesh fabric.

Having described the structure of mane taming device 10, the application and operation can now be understood. The horse's mane is first combed or otherwise aligned in a desired fashion. A small amount of water may be applied to the mane to facilitate its flattening. Mane taming device 10 is then placed over the horse's neck with the surface shown in FIG. 2 contacting the neck and the surface shown in FIG. 3 facing outward. The device is draped with panel 33 directly overlying the mane and center line 50 aligned symmetrically with respect to the horse. As an aid to positioning along the neck, strap 55 is passed under a portion of a bridle 60, and looped back on itself with fasteners 57 and 58 brought into contact. In the draped position, side edge 38 hangs lower than side edge 37 due to the asymmetric configuration described above. Side edge 38 is brought under the horse's neck and towards side edge 37 to the degree necessary to fit snugly around the neck. Collar 30 is typically sized so that side edge 38 actually passes beyond side edge 37, overlapping a portion of the collar between centerline 50 and side edge 37. Fasteners 45 engage corresponding fasteners 40 to hold the device in place, with collar 30 maintaining panel 33 over the horse's mane. The device is typically left in place for a relatively short period of time (e.g. 30 minutes or less).

Panel 33 holds the mane in a flat position. The nonporous nature of panel 33 causes the region of the horse's neck under the mane to undergo some sweating, thereby rendering the mane somewhat limp so that it holds the desired flat position when the mane taming device is later removed. If the mane was wetted prior to placement of the device, panel 33 in addition to causing the controlled sweating, prevents evaporation of the water. This renders the mane limp and manageable, and enhances the effect of the sweating induced by the device.

The size of collar 30 is determined by the requirement that it fit around the horse's neck in a snug, conforming fashion. Accordingly, collar 30 is typically scaled to the size of the horse to which mane taming device 10 is to be applied. The considerations in determining the size of panel 33 include the horses size and the climate in which the device is to be used. The object of the panel is to induce a controlled amount of sweating without causing so much sweating as to detract from the appearance of the mane. The device illustrated is suitable for use in most climates and includes a nonporous panel measuring approximately 8 inches by 26 inches. A 10 inch wide panel has also been used with success. FIGS. 2 and 3 are drawn generally to scale, so other dimensions can be determined from the drawings. In a hot climate, where the amount of sweating would be greater, a narrower panel (e.g., 6 inches wide) would be more appropriate. These dimensions are for full sized horses. As mentioned above, smaller horses require smaller devices, and also narrower panels. Accordingly, for small horses a panel width of 6 inches is appropriate in normal climates and 4 inches in especially hot climates.

We claim:

1. A device for causing a horse's mane to lie flat against the horse's neck comprising:
   a relatively nonporous flexible panel adapted to overlie the mane and hold the mane flat against the neck, the panel having a width less than the circumference of the neck so that the panel overlies only a region of the neck proximate the mane; and
   means for holding the flexible panel in the overlying relationship, to thereby induce controlled sweating by the horse and retain moisture beneath the panel which causes the mane to remain flat when the device is removed.

2. The device of claim 1 wherein the means for holding the flexible panel in the overlying relationship comprises:
   a relatively porous flexible collar supporting the panel, the collar being adapted to surround the neck in a snug conforming manner to hold the panel in contact with the mane.

3. A device for causing a horse's mane to lie flat comprising:
   a generally porous collar adapted to fit around the horse's neck;
   fastening means for maintaining the collar positioned around the horse's neck; and
   a generally nonporous flexible panel attached to the collar adapted to directly overlie the horse's mane in contact therewith when the collar is held in place by the fastening means.

4. The device of claim 3 wherein the collar is scaled to fit around the neck of a full sized horse, and wherein the panel has a width in the range of 5-12 inches.

5. The invention of claim 3 wherein the collar is scaled to fit a relatively small horse, and wherein the panel is about 4 inches wide.

6. The invention of claim 3 wherein the panel is substantially symmetric about a center line, and wherein the collar is substantially asymmetric about the center line, such that the fastening means is located along a side of the horse's neck when the collar is positioned around the horse's neck.

7. A process for causing a horse's mane to lie flat against the horse's neck comprising the steps of:
   placing the mane in the desired aligned position
   covering the mane with a relatively nonporous panel; and
   leaving the nonporous panel in contact with the mane for a predetermined length of time sufficient to induce a controlled amount of selective sweating in the region of the horse's neck underlying the mane; and
   removing the nonporous panel after the predetermined length of time such that the mane remains in the desired position.

8. The process of claim 7 including the step, carried out prior to covering the mane with a relatively nonporous panel, of wetting the mane.

9. A process for causing a horse's mane to lie flat against the horse's neck comprising the steps of:
   (a) flattening the mane;
   (b) inducing localized sweating in the region of the mane only;
   (c) retaining moisture in the region of localized sweating; and
   (d) discontinuing steps (b) and (c) after a predetermined length of time.

10. The process of claim 9 wherein steps (b) and (c) together comprise the steps of placing a relatively nonporous panel over the region, and biasing the nonporous panel against the mane.

11. The process of claim 10 wherein the biasing step includes the step of wrapping a generally porous collar around the neck to hold the panel in place, the porous collar preventing sweating and moisture retention in the region of the neck away from the mane.

* * * * *